(12) United States Patent
Ball

(10) Patent No.: US 7,234,732 B2
(45) Date of Patent: Jun. 26, 2007

(54) PIPE COUPLING FOR JOINING PIPES OF VARYING DIAMETERS

(75) Inventor: William T Ball, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 0 days.

(21) Appl. No.: 10/675,351

(22) Filed: Sep. 30, 2003

(65) Prior Publication Data

US 2005/0067833 A1    Mar. 31, 2005

(51) Int. Cl.
*F16L 55/00* (2006.01)

(52) U.S. Cl. ............................ 285/148.23; 285/286.2; 285/148.19

(58) Field of Classification Search ........... 285/148.18, 285/148.23, 148.19, 148.11, 148.13, 382, 285/382.1, 382.2, 256–257, 286.2
See application file for complete search history.

(56) References Cited

U.S. PATENT DOCUMENTS

| | | | | |
|---|---|---|---|---|
| 244,804 A | * | 7/1881 | Gillespie | 285/280 |
| 1,936,669 A | * | 11/1933 | Heeter | 285/3 |
| 2,025,067 A | * | 12/1935 | Miller | 285/148.23 |
| 2,498,395 A | * | 2/1950 | Coss | 285/98 |
| 2,574,625 A | * | 11/1951 | Coss | 29/443 |
| 2,583,956 A | * | 1/1952 | Lindsay et al. | 285/222.5 |
| 3,348,862 A | * | 10/1967 | Leopold, Jr. et al. | 285/39 |
| 3,612,584 A | * | 10/1971 | Taylor | 285/148.13 |
| 4,093,280 A | * | 6/1978 | Yoshizawa et al. | 285/39 |
| 4,103,941 A | * | 8/1978 | Stoll | 285/238 |
| 4,266,813 A | * | 5/1981 | Oliver | 285/12 |
| 4,703,956 A | * | 11/1987 | Keech | 285/133.3 |
| 4,712,812 A | * | 12/1987 | Weir, III | 285/148.23 |
| 4,790,573 A | * | 12/1988 | Cardozo | 285/330 |
| 5,109,929 A | * | 5/1992 | Spears | 169/16 |
| 5,366,257 A | * | 11/1994 | McPherson et al. | 285/148.11 |
| 5,399,173 A | * | 3/1995 | Parks et al. | 604/533 |
| 5,437,481 A | * | 8/1995 | Spears et al. | 285/148.13 |
| 6,186,558 B1 | * | 2/2001 | Komolrochanaporn | 285/148.19 |
| 6,447,017 B1 | * | 9/2002 | Gilbreath et al. | 285/89 |
| 6,467,752 B2 | * | 10/2002 | Woods | 251/148 |

* cited by examiner

*Primary Examiner*—David Bochna

(57) ABSTRACT

A pipe coupling for joining a first pipe to pipes of varying diameters includes first and second hollow fittings which are secured together in end-to-end relationship by a crimping process to rigidly hold the fitting members together to form a continuous fluid passageway. The first fitting member is comprised of metal, and a second fitting member is comprised of plastic material. The second fitting member has a pair of well openings with the outer well adjacent one end thereof being of a greater diameter than the inner well. The outer well is adapted to receive the end of a hollow plastic pipe of greater diameter, e.g., ¾". The second well is available alternatively to receive the end of a plastic pipe of reduced diameter, e.g., ½".

10 Claims, 6 Drawing Sheets

PIPE COUPLING FOR JOINING PIPES OF VARYING DIAMETERS

BACKGROUND OF THE INVENTION

It is common to attach the inner end of a wall hydrant to a plastic pipe connected to a source of pressurized water. However, the typical wall hydrant may be mass produced to be attached to a plastic pipe, for example, having an outside diameter of ¾", when, in a given situation, the pressurized inlet water line is a plastic pipe having an outside diameter of only ½". It is difficult and time consuming to introduce reduction couplers or the like to permit the ½" O.D. plastic pipe to be joined to a ¾" ID coupling on the inner end of the hydrant.

Therefore, it is a principal object of this invention to provide a pipe coupling for joining pipes of varying diameters.

A further object of this invention is to provide a pipe coupling for joining pipes of varying diameters which is economical of manufacture, and which can be easily and quickly used to join such pipes.

These and other objectives will be apparent to those skilled in the art.

SUMMARY OF THE INVENTION

A pipe coupling for joining a first pipe to pipes of varying diameters includes first and second hollow fittings which are secured together in end-to-end relationship by a crimping process to rigidly hold the fitting members together to form a continuous fluid passageway. The first fitting member is comprised of metal, and a second fitting member is comprised of plastic material. The second fitting member has a pair of well openings with the outer well adjacent one end thereof being of a greater diameter than the inner well. The outer well is adapted to receive the end of a hollow plastic pipe of greater diameter, e.g., ¾". The second well is available alternatively to receive the end of a plastic pipe of reduced diameter, e.g., ½".

This coupling is ideal, for example, to secure PVC pipe to the inner end of a wall hydrant having a metal tube with an inlet end for connection to the coupling.

DESCRIPTION OF THE PREFERRED EMBODIMENT

Figure 1:
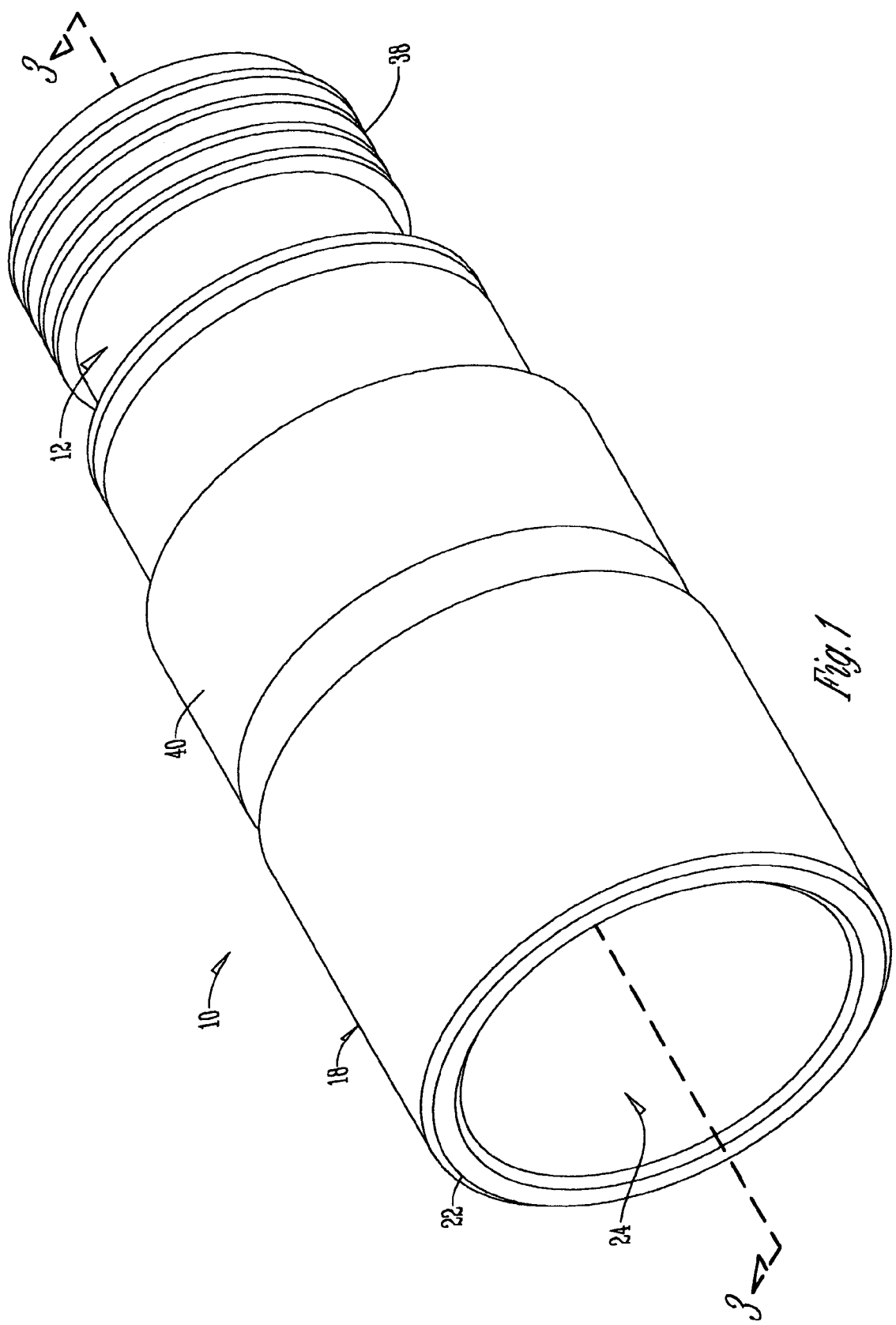
FIG. 1 is a perspective view of the pipe coupling of this invention.
Figure 2:
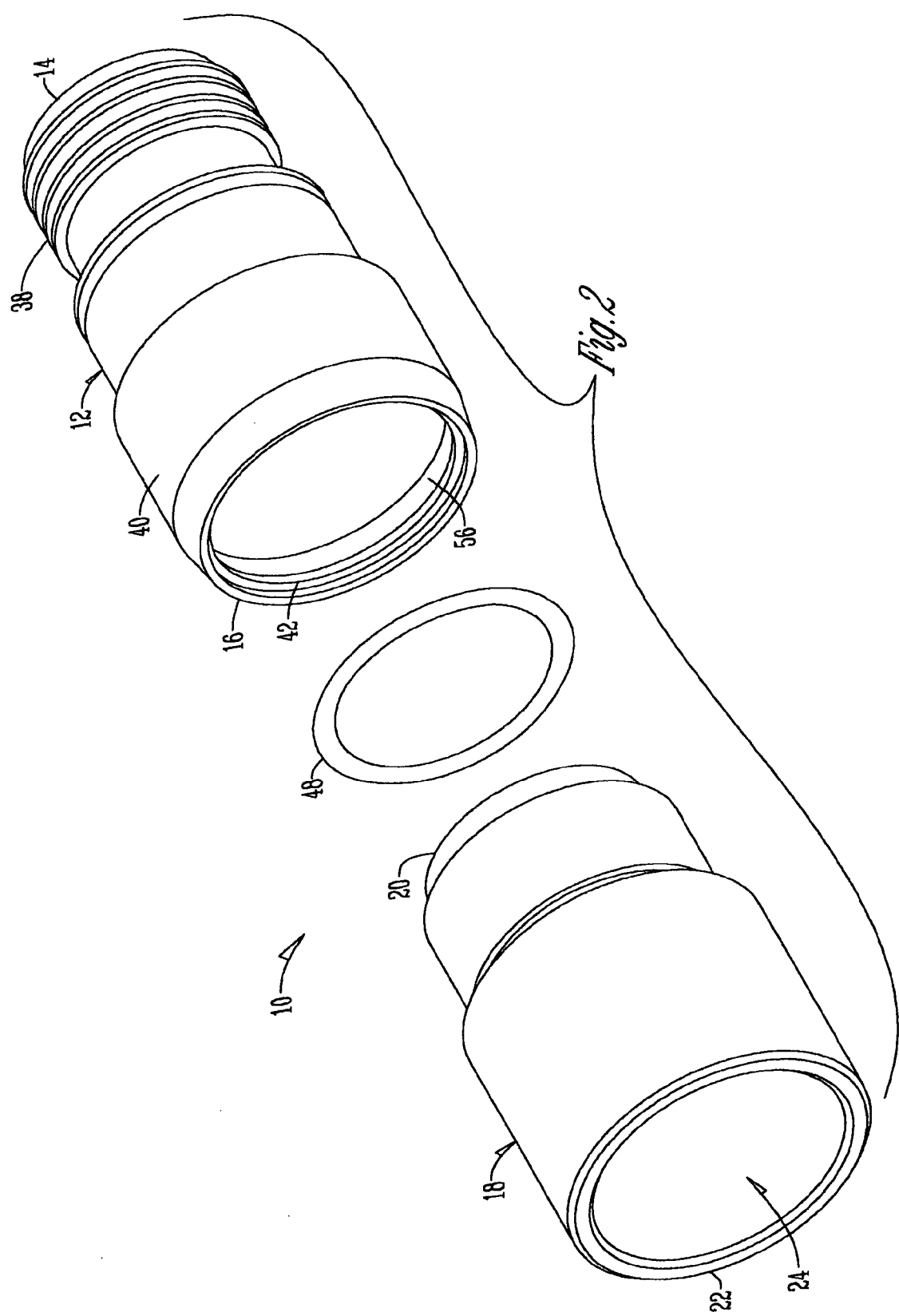
FIG. 2 is an exploded perspective view of the components of the pipe coupling of FIG. 1.

With reference to FIGS. 1 and 2, the pipe coupling 10 is comprised of a first hollow fitting 12 having a first end 14 and a second end 16. A second hollow fitting 18 has a first end 20 and a second end 22. When the two hollow fittings 12 and 18 are coupled together in end to end relationship (FIG. 3), a continuous fluid passageway 24 is created by virtue of the hollow interior 26 of fitting 12 and the hollow interior 28 of fitting 18.

Figure 3:
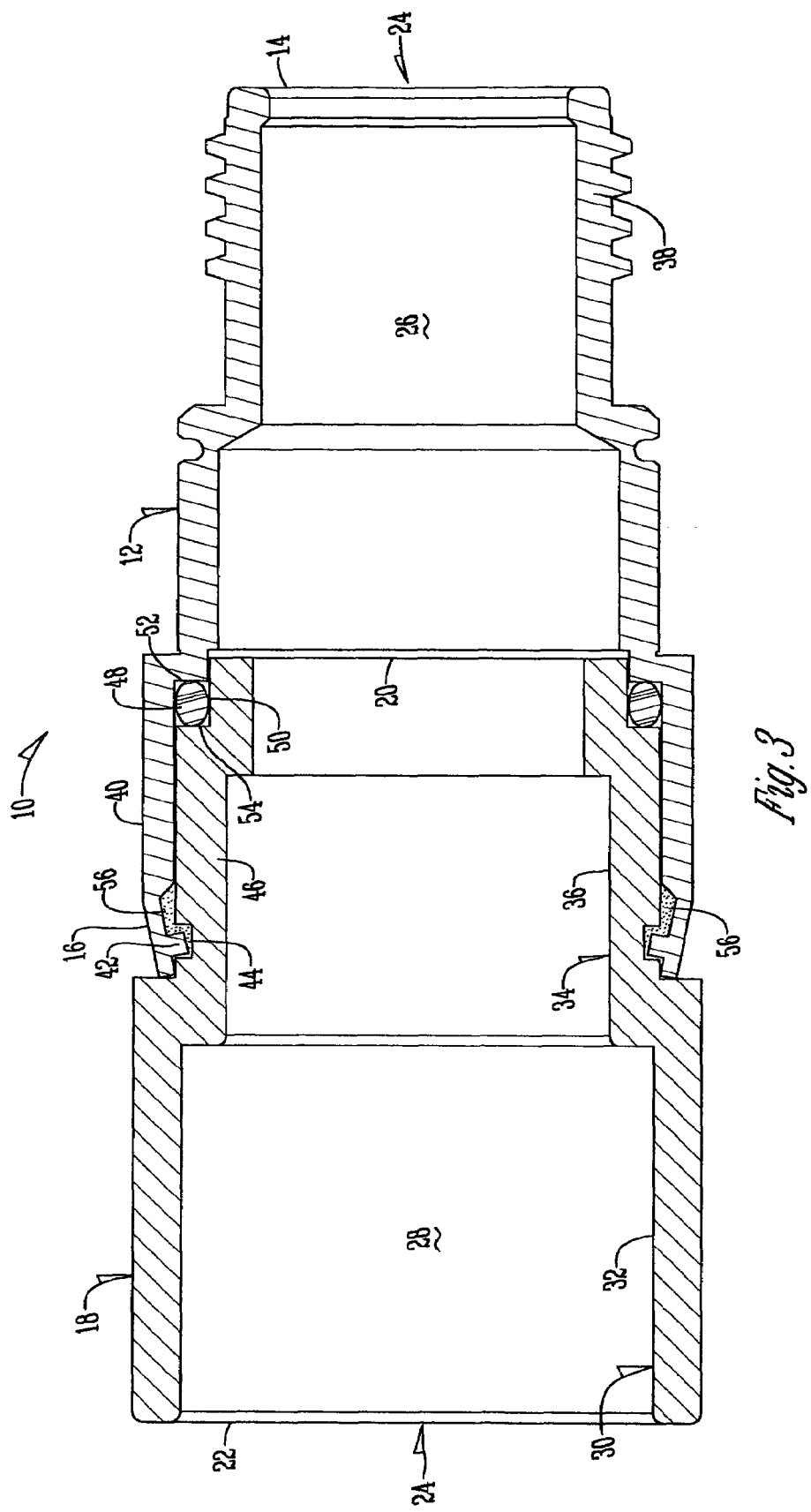
FIG. 3 is a longitudinal sectional view taken on line 3—3 of FIG. 1.

The larger well 30 in fitting 18 has a typical diameter of ¾" and has a cylindrical interior wall surface 32 (FIG. 3). The second well 34 is immediately adjacent the well 30 and has a cylindrical wall surface 36. The second well has a typical diameter of ½".

Figure 5:
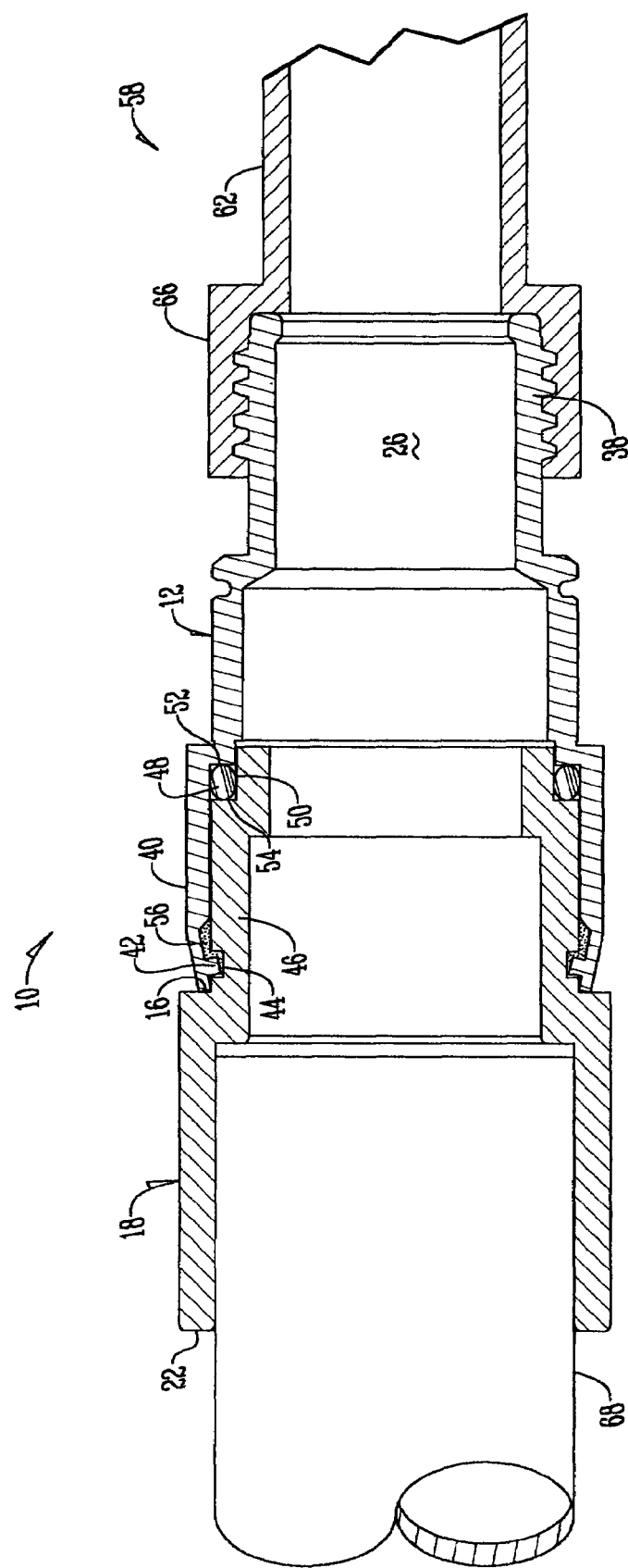
FIG. 5 is a partial sectional view taken on line 5—5 of FIG. 4 with a large diameter plastic pipe secured within the inner end of the coupling.
Figure 6:
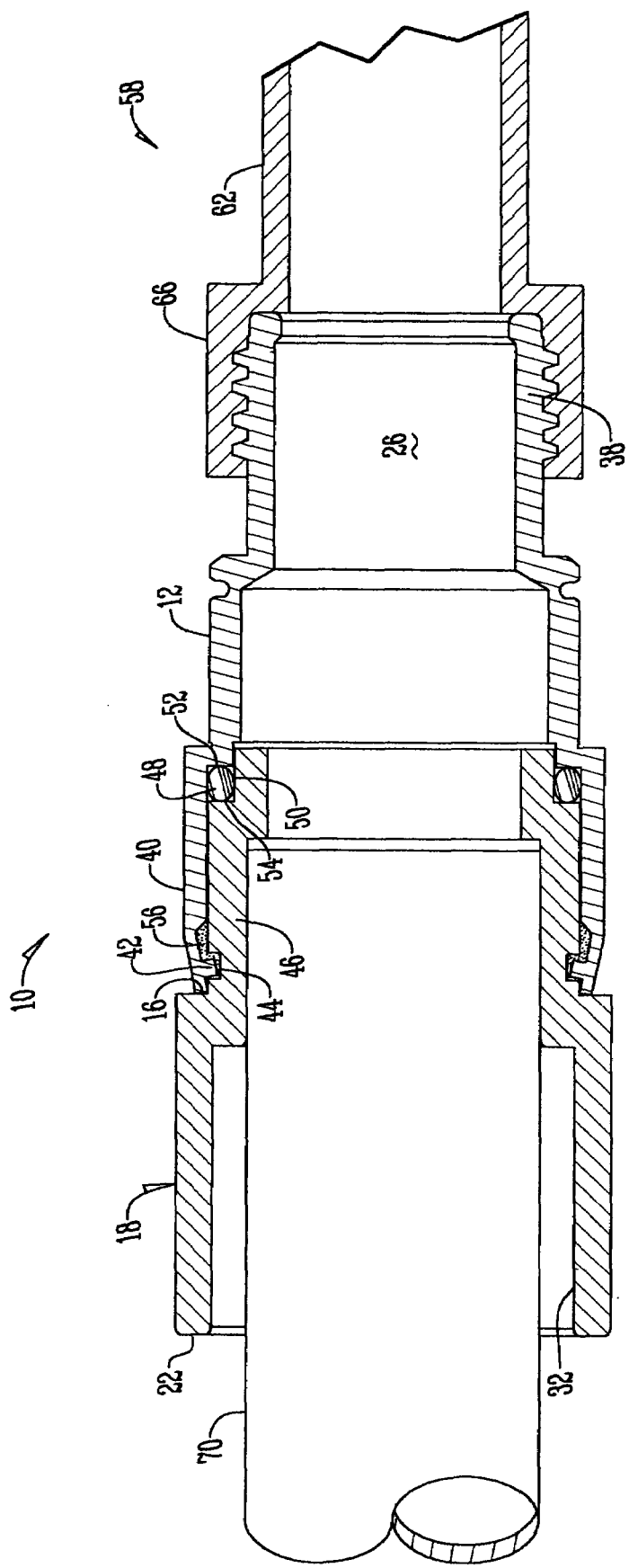
FIG. 6 is a partial sectional view similar to that of FIG. 5 with a small diameter plastic pipe secured within the inner end of the coupling.

The first hollow fitting 12 has a threaded nipple portion 38 formed at end 14. An enlarged diameter sleeve 40 is formed in fitting 12 at its inner end 16. An internal annular detent 42 is formed adjacent end 16 and fits into the annular groove 44 formed on the reduced diameter wall portion 46 of fitting 18 (FIGS. 3, 5 and 6). A conventional O-ring seal 48 is located within notch 50 formed between shoulder 52 of fitting 12 and shoulder 54 of fitting 18 when the two fittings are placed together in overlapping condition as shown in FIGS. 3, 5 and 6. A conventional sealant 56 (FIG. 3) can be inserted around detent 42 and within groove 44. The detent 42 is typically crimped inwardly to assume its position within annular groove 44.

Figure 4:
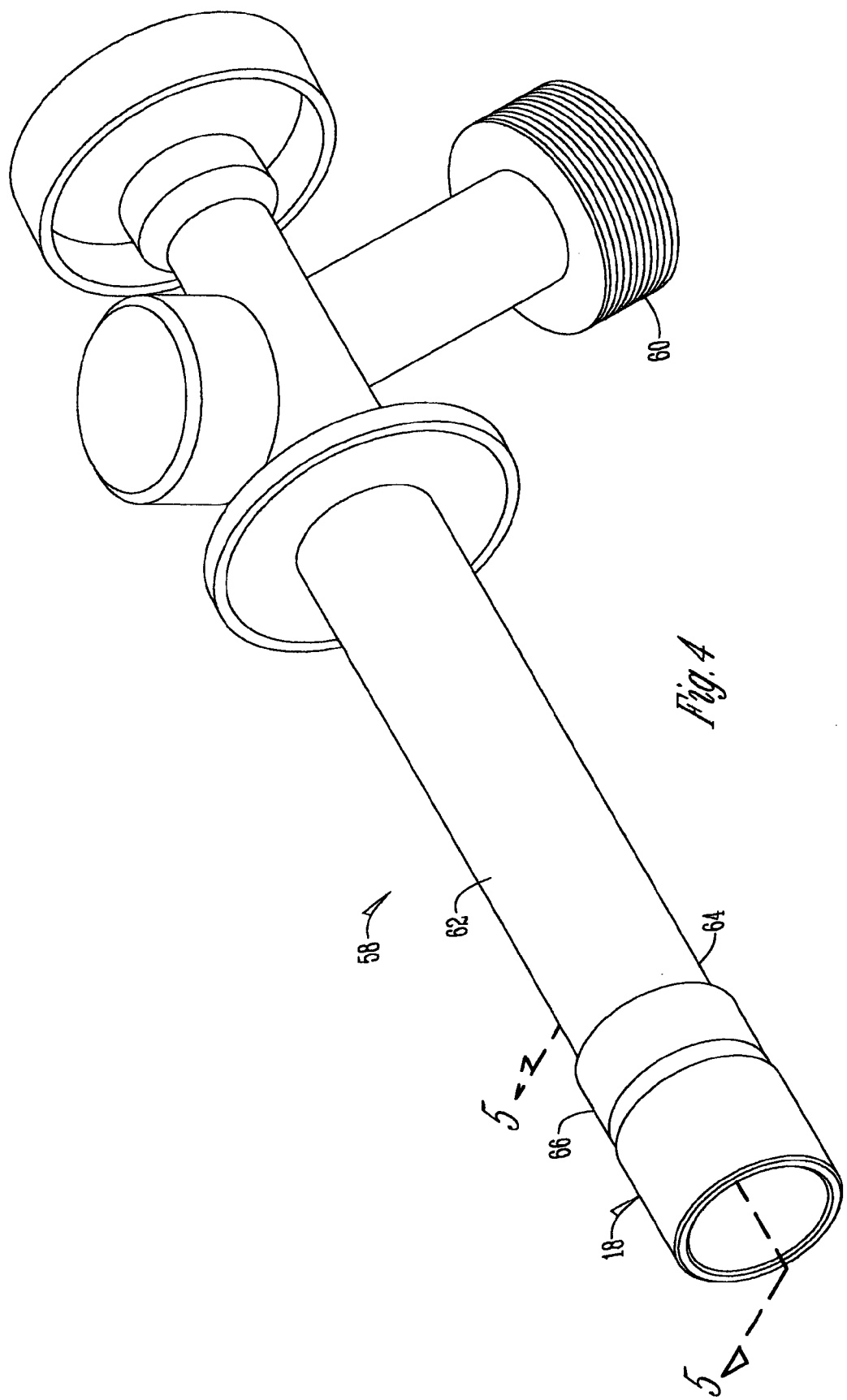
FIG. 4 is a perspective view of the coupling of this invention secured to the inner end of a wall hydrant.

With reference to FIG. 4, a typical wall hydrant 58 has a fluid outlet 60 and an elongated fluid inlet tube 62 having an inner end 64 terminating in an internally threaded flange 66 (see FIG. 5). Typically, the tube 62 and flange 66, along with fitting 12 are comprised of metal such as copper or the like. The fitting 18 is slidably inserted into the large diameter sleeve 40 after sealant 56 has been placed in the area of annular groove 44 (FIG. 3). The O-ring 48 will have been placed around and in front of the shoulder 54 of fitting 18 before the sliding action takes place. When the two fittings 12 and 18 are in their overlapping position shown in FIG. 3, the end 16 of the fitting 12 is crimped inwardly so that the detent 42 is pushed into the annular groove 44, as described above and as shown in FIG. 3. This effectively locks the two fittings 12 and 18 together in longitudinal alignment, thus creating the elongated fluid passageway 24. The assembled coupling can then be threadably inserted into the sleeve 66 of hydrant 58 as best shown in FIG. 5. If a larger inlet pipe for the installation of the wall hydrant 58 is required, such as a ¾" O.D. pipe, the end of such a pipe 68 is inserted into the well 30 with a quantity of adhesive on its outer surface so as to be adhesively secured within the well 30 (FIG. 6). If the installation of hydrant 58 requires a smaller inlet pipe carrying pressurized water to be used, a smaller pipe 70 is inserted into well 34 in the same manner as shown in FIG. 6. Again, the fitting 18 and the pipes 68 and 70 are typically of PVC plastic material.

It is therefore seen that the pipe coupling of this invention is well adapted to be utilized with inlet pipes of varying diameters. While the coupling is especially adapted to accommodate PVC pipes, it could be of other materials or it could utilize threaded connections between the end of such pipes and the interiors of the wells 32 and 34. It is thus seen that this invention will achieve at least all of its stated objectives.

I claim:

1. A pipe coupling for joining a first pipe to pipes of varying diameters, comprising, a first hollow fitting having opposite first and second ends, with the first end being adapted for connection to a first pipe, a second hollow fitting having first and second ends with the second end fitting slidably within the second end of the first hollow fitting in sealed condition to define a fluid conduit extending through interiors of the first and second hollow fittings, first and second adjacent wells in the second hollow fitting, with the first well being adjacent the second end of the second fitting and having an upper end terminating in the first well, with both the first and second wells comprising at least a part of the fluid conduit, the first and second wells being cylindrical in shape with the second well having a diameter greater than the diameter of the first well, whereupon inlet pipes having outside diameters complimentary in size to the diameters of the wells can be selectively and alternately secured within the respective wells to fluidly connect such pipes to the fluid conduit and the first hollow fitting;

a pressurized fluid supply pipe having an end secured within one of the wells; and wherein at least one well has adhesive therein for securing the well to a pressurized fluid supply therein.

2. A pipe coupling for joining a first pipe to pipes of varying diameters, comprising, a first hollow fitting having a first end opposite a second end, the first end having and externally threaded nipple portion and the second end having and enlarged diameter sleeve terminating in an annular detent, a second hollow fitting having an annular groove on a reduced diameter wall portion, wherein the first hollow fitting and the second hollow fitting are placed together in an overlapping condition such that the annular detent fits into the annular groove; and wherein a conventional sealant is inserted within the annular groove.

3. The pipe coupling of claim 2 wherein a conventional o-ring seal is located within a notch formed between a shoulder of the first hollow fitting and a shoulder of the second hollow fitting.

4. The pipe coupling of claim 2 wherein the annular detent is crimped inwardly.

5. The pipe coupling of claim 2 wherein the second hollow fitting having a first end opposite a second end, the first end having a first well terminating in a second well having a diameter greater than the diameter of first well.

6. The pipe coupling of claim 5 wherein the first well is separated from the second well by a shoulder.

7. The pipe coupling of claim 5 wherein the first and second wells being cylindrical in shape such that a second pipe having an outside diameter complimentary to the diameter of a well can be selectively and alternatively secured within a well.

8. The pipe coupling of claim 2 wherein the first end of the first hollow fitting having a first well terminating in a second well having a diameter greater than the diameter of the first well.

9. The pipe coupling of claim 8 wherein the first well is separated from the second well by a shoulder.

10. A pipe coupling for joining a first pipe to pipes of varying diameters, comprising, a first hollow fitting having a first end opposite a second end, the first end having an externally threaded nipple portion and the second end having an enlarged diameter sleeve terminating in an annular detent, a second hollow fitting having an annular groove on a reduced diameter wall portion, wherein the first hollow fitting and the second hollow fitting are placed together in an overlapping condition such that the annular detent fits into the annular groove; and wherein a conventional sealant is inserted around the detent.

* * * * *